US006088111A

United States Patent [19]

Ciani et al.

[11] Patent Number: 6,088,111

[45] Date of Patent: *Jul. 11, 2000

[54] SELECTION AND CONTROL DEVICE FOR BARS AND RELATIVE METHOD

[75] Inventors: Lorenzo Ciani, Udine; Giuseppe Bordignon, Bicinicco, both of Italy

[73] Assignees: Centro Automation SpA; Danielli C. Officine Meccaniche SpA, both of Buttrio, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 09/187,404

[22] Filed: Nov. 6, 1998

[30] Foreign Application Priority Data

Nov. 6, 1997 [IT] Italy ................................ UD97A0200

[51] Int. Cl.[7] ..................................................... G01B 11/10

[52] U.S. Cl. .......................... 356/385; 209/536; 209/586; 250/559.24; 250/559.39

[58] Field of Search .................................... 356/384, 385, 356/386, 387; 209/517, 518, 520, 521, 576, 551, 536, 586, 587; 198/434, 459.4, 453, 958; 414/745.1, 746.2; 250/559.24, 559.39, 559.4, 223 R

[56] References Cited

U.S. PATENT DOCUMENTS

| | | | |
|---|---|---|---|
| 3,373,868 | 3/1968 | Missioux . | |
| 3,897,156 | 7/1975 | Chasson | 356/385 |
| 4,271,967 | 6/1981 | Matsuo et al. | 356/384 |
| 4,687,107 | 8/1987 | Brown et al. | 356/385 |
| 5,003,563 | 3/1991 | Passmore . | |
| 5,212,539 | 5/1993 | Wogerbauer | 356/384 |
| 5,301,011 | 4/1994 | Hoppe et al. | 356/385 |
| 5,666,204 | 9/1997 | Koskenohi | 356/384 |

FOREIGN PATENT DOCUMENTS

| | | |
|---|---|---|
| 365102 | 4/1990 | European Pat. Off. . |
| 450287 | 7/1936 | United Kingdom . |

OTHER PUBLICATIONS

Patent Abstracts of Japan vol. 14, No. 272 (P–1060), Jun. 12, 1990 & JP 02 077892 A (Toshiba Corp) Mar. 16, 1990, Abstract.

Patent Abstracts of Japan, vol. 15, No. 111 (P–1180), Mar. 18, 1991, & JP–03 002993 A (Sumitomo Metal Ind. Ltd), Jan. 9, 1991—Abstract.

*Primary Examiner*—Hoa Q. Pham
*Attorney, Agent, or Firm*—Antonelli, Terry, Stout & Kraus, LLP

[57] ABSTRACT

Selection and control device to count bars being fed separated orthogonally to their axis on a plane and cooperating with a translating device such as a screw-type translator, the device including two optical monitors and a processing unit, the optical monitors being arranged at an angle with their apex substantially on the plane on which the bars are fed and whose respective monitoring axes cooperates with a portion of the plane on which the bar being fed passes. The respective monitoring axes have an angle of incidence with respect to the plane on which the bars are fed in the proximity of a common point cooperating substantially with the positioning seating of the bars on the translating device, each of the monitors lying on a plane substantially orthogonal to the plane on which the bars are fed, and to the axis of the bars, and including respective angles ("α","β") with respect to a line vertical to the plane of feed, the angles ("α", "β") defining an angle ("γ") at the apex, the apex lying substantially on a line vertical to the plane of feed of the bars. The processing unit is suitable to receive the signal concerning the field explored by each of the optical monitors, to transform the signal into a dimensional value, to compare the dimensional value with the pre-set nominal diameter of the bars and to supply, according to this comparison, an indication as to the number of bars present in the seating of the translating device.

14 Claims, 2 Drawing Sheets

SELECTION AND CONTROL DEVICE FOR BARS AND RELATIVE METHOD

FIELD OF THE INVENTION

This invention concerns a selection and control device for bars and the relative method.

To be more exact, the invention concerns a selection and control device which is employed to count round bars as they travel in a direction orthogonal to their axis transported by a worm screw or another similar device.

The invention is applied principally in the field of rolling mills and is used to count the bars leaving a cooling bed and sent to a packing system.

The invention is applied in particular in plants where the rolled stock is sold according to the number of bars, rather than by weight, and therefore where it is essential that there are no mistakes in counting before the packing step, so as to prevent inaccuracies and economic damage.

BACKGROUND OF THE INVENTION

Bars translated orthogonally to their axis by worm screws or similar devices, which tend to differentiate and separate the position of one bar with respect to the adjacent bar, may often find themselves in a position where they may twist and overlap.

This may happen either because one bar falls or because the separator means do not intervene correctly.

This problem is particularly serious at the outlet of rolling processes where thin diameters are worked.

Translating one bar at a distance from the next is a necessary factor if the bars are to be counted correctly.

If two bars travel orthogonally together, counting means such as are known to the art do not give a univocal figure, and certainly do not guarantee that the phenomenon will be correctly identified.

This means that, as the pack is formed, more bars are introduced therein than the number counted, which creates both management problems and considerable economic problems.

This invention therefore has the purpose of achieving a selection and control device for bars which will make it possible to univocally identify whether there is a single bar in transit, or two or more bars travelling adjacent inside a single seating of the translation means, and which therefore cannot be individually recognised by the counting means.

JP-A-03002993 teaches to use two optical detectors to count bars moving on a plane.

The optical detectors are suitable to prevent counting mistakes caused by any possible inclination or misalignment of the bars, and to distinguish the direction of feed, either forwards or backwards, of the bars.

The optical detectors disclosed in JP'993, however, are not suitable to recognise and ascertain the presence of one or more bars in a single seating of the translation means, or to possibly provide information on the number of bars which can be found, erroneously, positioned in one seating of the said translation means.

In order to solve this deficiency in the state of the art, the present Applicant has designed and tested this invention.

DISCLOSURE OF THE INVENTION

The invention provides to place two optical monitoring means on a plane substantially orthogonal to the plane of feed of the bars.

According to the invention, the optical monitoring means cooperate at a common point which is near the plane of feed of the bars, and explore a portion of the plane whereon the bars pass.

According to a first embodiment of the invention, the axis of the first optical monitoring mean is rotated by an angle of between 120° and 60° with respect to the axis of the second optical monitoring mean, with an angle of about 90° being preferred.

It is also preferable, though not essential, that the two optical monitoring means are symmetrical with respect to a vertical plane passing substantially through the centre line of the counting seating of the counting means, that is to say the nominal and theoretical housing seating of the individual bar which is to be counted.

According to a variant, the two optical monitoring means are not complanar and each one lies on its own respective plane, substantially orthogonal to the plane of feed of the bars.

The two planes on which the two optical monitoring means lie are in any case near each other, so as to avoid monitoring two different positioning conditions of the bars.

In a first embodiment of the invention, the optical monitoring means consist of optical feelers, for example photocells or sensors, connected with a processing unit.

The optical feelers are of a type suitable to send a ray of light in the direction of the bars and to monitor the return ray reflected by the bars.

According to a variant, the optical feelers are of the type associated with lighting means arranged behind the bars.

During the translation movement of the bars in a direction orthogonal to their axes, each optical feeler explores a volume, substantially cylindrical in shape, whose base diameter is at least less than the diameter of the bars to be controlled and counted, and sends a signal reporting this exploration to the processing unit.

The processing unit recognises the presence of the bar and is suitable to correlate the speed at which it is fed with the time during which the bar, as it advances in the proximity of the common point of cooperation of the two optical feelers, remains inside the volume explored by each optical feeler.

According to a variant, this correlation is deduced from the extension of the volume subtended by the feeler, in such a way that the subtended volume cannot influence the sensitivity of the monitoring.

When compared with the nominal diameter of the bar, the correlation indicates if the optical feeler has explored one or more bars.

In the event that there is only one bar in correspondence with the common point of cooperation of the two optical feelers, for example a seating of the translation means, the correlation of the two optical feelers will be substantially identical and in practice coherent with the nominal diameter of the bar.

For example, in the event that two bars occupy the same seating and are totally or partly overlapping, each of the two optical feelers will give a correlation which is identical to or different from that supplied by the other feeler; in any case, even if this correlation given by the two feelers is identical, it will not be coherent with the nominal diameter of the bars, but will be greater than said nominal diameter and will therefore indicate that there are two or more bars present.

Similarly, if there is a different correlation between the two optical monitoring means, the difference alone between the two correlations will be sufficient to indicate that there are two or more bars present.

In another embodiment of the invention, the optical monitoring means consist of two linear video cameras arranged on the same plane substantially orthogonal to the plane of feed of the bars, and associated with lighting means arranged behind the bars.

The video cameras, properly activated in a synchronised manner, are suitable to explore an angular section located on a plane orthogonal to the plane of feed of the bars as arranged on the translation means, and to measure the size thereof.

However, unlike in the previous embodiment, the video cameras measure the bars with a single scan and therefore very quickly, so quickly that the bars may be considered stationary, that is to say, the information relating to the translation movement of the bars is not needed, in order to discover the size thereof.

The appropriate angling of the video cameras with respect to the plane on which the bars lie, together with the combination of the images taken by each video camera, allows the processing unit to correlate the data with a comparative parameter corresponding to the nominal diameter of the bars.

If there is only one bar in the relative seating, the data monitored by the two video cameras is the same and coherent with the nominal diameter of the bar.

If there are two or more bars, the data monitored by the two video cameras may be the same, but not coherent with the nominal diameter of the bar, or may be different.

However, in both cases, the processing unit will be able to discern the presence of a single bar, or of two or more bars, inside the relative seating in which the bars are fed.

BRIEF DESCRIPTION OF THE DRAWINGS

With reference to the attached Figures, which are given as a non-restrictive example.

DETAILED DESCRIPTION OF THE PREFERRED EMBODIMENT

Figure 1:
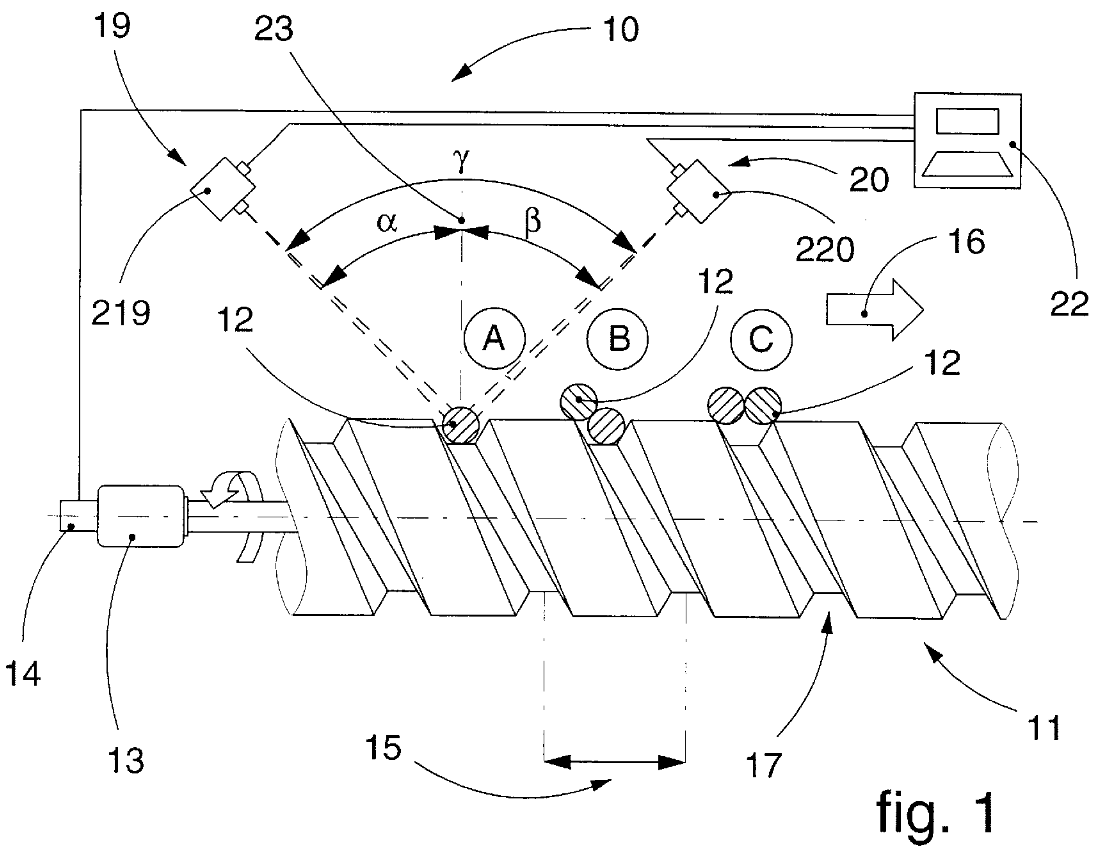
FIG. 1 shows the invention seen from the side and applied to a screw-type translator.

The Figures show a screw-type translator 11 which, in the plurality of screw-type translators 11 which make up a translation and counting assembly located downstream of an area for cooling rolled stock and upstream of a packing area, translates the bars 12 in a direction orthogonal to the axis of the bars 12 themselves.

Instead of screw-type translators it is possible to use belt translators, step translators, etc.; the only relevant fact is that the translator separates and keeps separate the bars 12 while it feeds them forwards, defining a nominal and theoretical seating where each of the bars 12 is housed.

The nominal diameter 18 of the bars 12 (see FIG. 2) is memorised in a data processing unit 22.

In this case, the screw-type translator 11 is driven by means including transducers 14 which monitor the number of revolutions of the translator 11.

The screw-type translator 11 has a pitch 15 and feeds the bars forward in the direction 16 thanks to the helical cavities 17 with a pitch 15; each of the helical cavities 17 defines the nominal housing seating for each individual bar 12.

The bars 12 may arrive on the helical cavities 17 in several different conditions.

The attached Figures show four conditions which substantially constitute the limit conditions, and all the possible intermediate cases can be referred to one or another of these limit conditions.

In condition "A", which constitutes the correct condition to separate and count the bars, there is only one bar in the cavity 17.

In condition "B", there are two bars 12 in the cavity 17, arranged substantially at an angle of 45° with respect to the longitudinal axis of feed.

In condition "C", there are two bars 12 partly contained in the cavity 17, arranged substantially on a plane parallel to the axis of feed.

Figure 3:
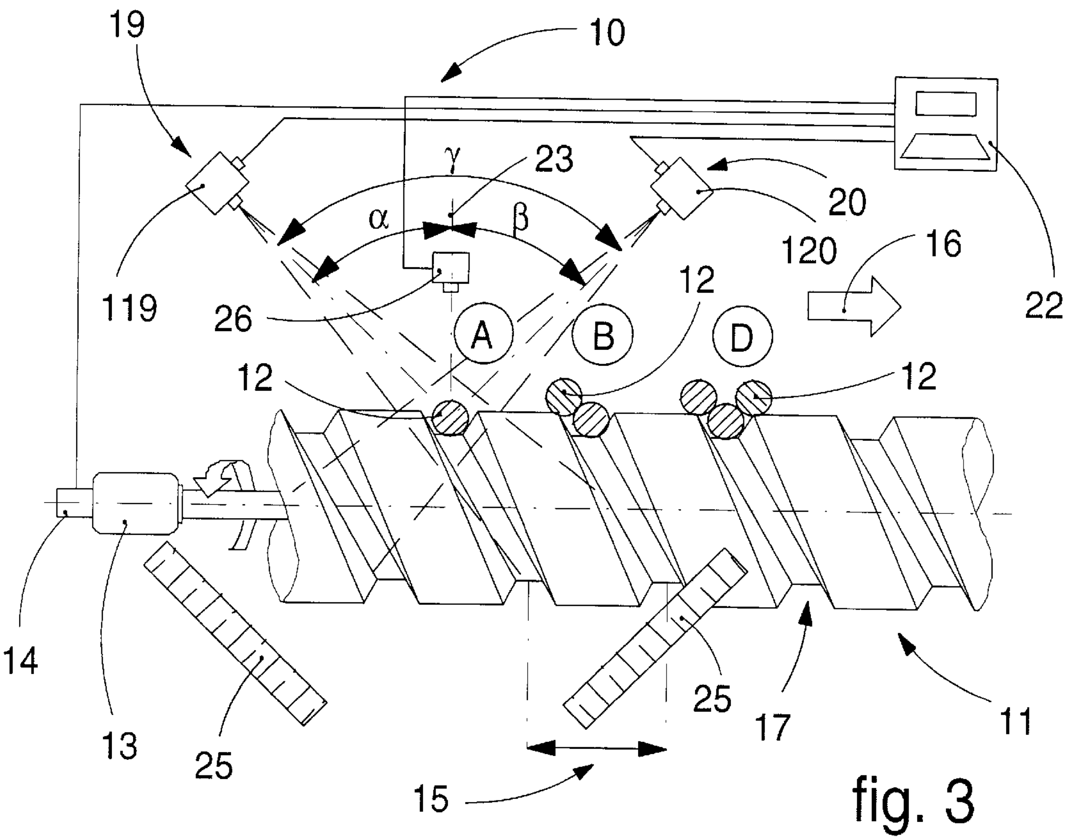
FIG. 3 shows a variant of FIG. 1.

In condition "D", shown in FIG. 3, there are three bars arranged in the cavity 17.

Figure 2:
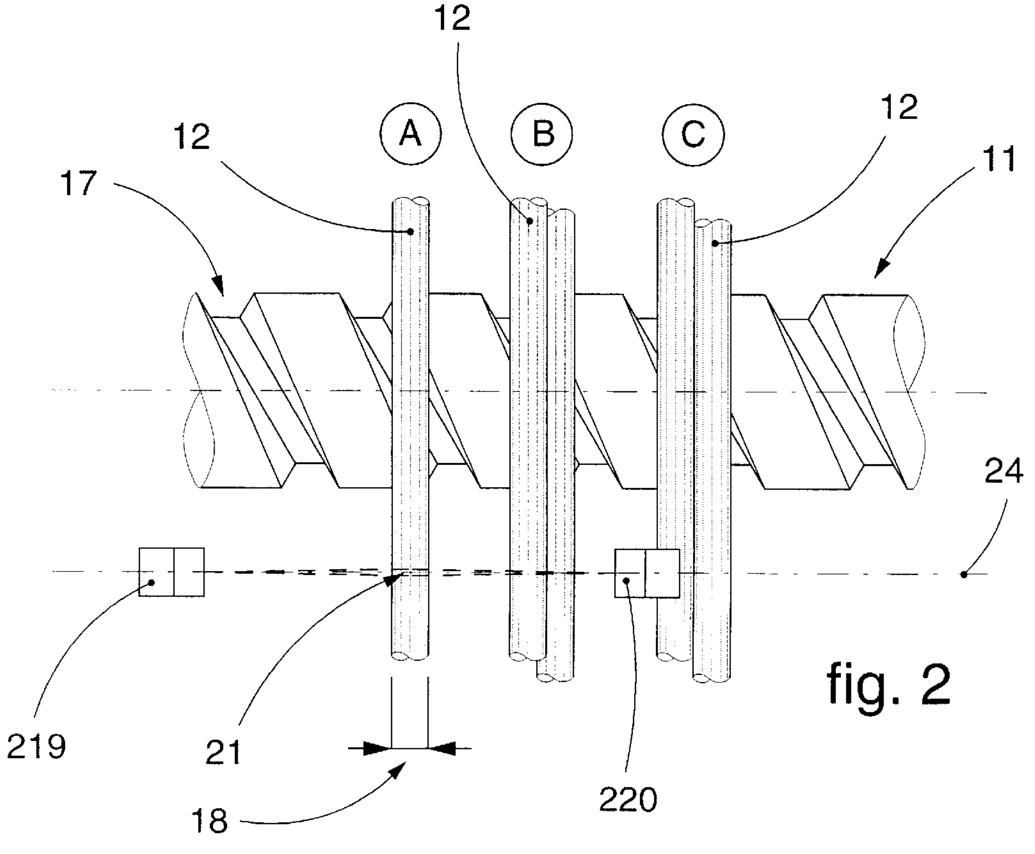
FIG. 2 is a view from above of the example shown in FIG. 1.

The device 10 substantially consists of two optical monitoring means 19 and 20, consisting, in the first embodiment shown in FIGS. 1 and 2, of two optical feelers 219 and 220 which each produce a very limited control volume 21 which in any case has a basic diameter with a controlled value, less than the diameter 18 of the bars 12.

The optical feelers 219 and 220 are located symmetrical, in this case, with respective angles "$\alpha$" and "$\beta$" with respect to a vertical line 23 to the plane of feed and passing substantially through the centre line of the cavity 17.

In this case the angles "$\alpha$" and "$\beta$" are the same, and equal to 45°, therefore the angle at the apex "$\gamma$" defined by the device 10 is 90°.

It is within the scope of the invention that the angles "$\alpha$" and "$\beta$" are different and that the angle "$\gamma$" at the apex can have values preferably of between 60° and 120°.

The optical feelers 219 and 220 operate on a plane 24 which is orthogonal to the plane of feed defined by the screw-type translators 11 and is also orthogonal to the axis of the bars 12.

According to a variant which is not shown here, the two optical feelers 219 and 220 are arranged on different planes, substantially orthogonal to the plane of feed defined by the screw-type translators 11.

The two planes on which the optical feelers 219 and 220 lie are distanced so that the optical ray of one feeler which illuminates the bars 12 cannot be reflected onto the other feeler whatever the positioning of the bars 12 may be, thus preventing any interference in the monitoring.

The two planes on which the optical feelers 219 and 220 lie are in any case near each other, so as to monitor the same positioning condition of the bars 12.

When the diameter 18 of the bars 12 and the pitch 15 of the screw-type translator 11 are input into the data processing unit 22, the latter receives the number of revolutions from the transducer 14 and, by processing it according to the pitch 15, determines the linear speed of feed of the bars 12 in the direction 16.

In case "A", the processing unit 22 will receive from the two optical feelers 219 and 220 a respective recognition time which is substantially the same; by processing this time according to the speed of feed of the bars 12, the data processing unit 22 can calculate, to a sufficient level of accuracy, the measurement of the diameter 18 of the bars 12 and compare it with the pre-set nominal diameter.

When the time taken by the optical feelers 219 and 220 to recognise the bars is the same, and when there is a substantial coincidence between the measurement obtained by this monitoring and the diameter 18, this is an indication that there is a single bar 12 in the cavity 17.

In case "B", the second feeler 220 will communicate to the data processing unit 22 a recognition time which will be substantially double that communicated by the first feeler 219, given that the two bars 12 will be arranged in adjacent positions and aligned on an axis substantially orthogonal to the monitoring axis of the second feeler 220.

This will indicate that there are two bars 12, and this indication can also be verified by obtaining the relative measurements of the optical feelers 219 and 220 used for comparison with the pre-set nominal diameter 18.

The data processing unit 22 is also able to recognise that there are two bars 12 present in the event that the two bars 12 arrive adjacent on an axis substantially orthogonal to the monitoring axis of one optical feeler 219 or 220 but separated by a gap.

In this case, one optical feeler will detect the presence of two bars 12, and the other will detect the presence of one bar 12 only, both according to the correct nominal diameter of the bar 12 itself; however, the data processing unit 22 will recognise this condition as wrong and will signal that there are two bars 12 in a single cavity 17.

In the limit case "C", wherein the bars 12 are adjacent on a plane parallel to the plane of feed, the two optical feelers 219 and 220 communicate to the data processing unit 22 an identical time taken to recognise the presence of the bars; however, this time assumes a value which is substantially greater by 40% with respect to the time taken in case "A", due to the angles formed by the axis of the feelers 219 and 220 with respect to the plane of feed.

When the data processing unit 22 recognises this excessive time taken to recognise the presence of the bar 12, this indicates that there are two bars 12 present.

Obviously, all the cases included between the condition when the time taken to recognise the presence of the bar 12 is transformed into a measurement of the diameter which substantially coincides with the nominal diameter, and the limit condition with two bars 12 perfectly adjacent and parallel to the plane of feed, will be recognised as an indication that there are two bars 12 in a single cavity 17.

In the variant shown in FIG. 3, the optical monitoring means 19 and 20 consist of digital video cameras 119 and 120, arranged like the optical feelers 219 and 220 angled by respective angles "α" and "β" with respect to a vertical line 23 to the plane of feed of the bars 12.

The video cameras 119 and 120 are of the linear type, they cooperate with respective lighting means 25 arranged behind the bars 12 and are suitable to make dimensional measurements by monitoring the shadow of the bar 12 with respect to the relative monitoring cone.

The video cameras 119 and 120 may make the dimensional monitoring on a static image too, and therefore, unlike the optical feelers 219 and 220, they do not need any cooperation with the translation movement of the bars 12.

However, it is necessary that the video cameras 119 and 120 are activated simultaneously and supply the monitoring signal simultaneously to the processing unit 22.

In the preferential embodiment of the invention, the video cameras 119 and 120 function continuously, and the processing unit 22 activates the discrimination function when both the video cameras 119 and 120 simultaneously supply an image congruous with the presence of the bars 12 in the center of their reading field, that is, shadow at the center and light at the sides.

According to a variant of the invention, in cooperation with the screw-type translator 11 there are means to simultaneously activate the video cameras 119 and 120, consisting, in this case, of an optical activating sensor 26.

In other embodiments of the invention, the photocell 26 may be replaced by cam means to automatically activate the photocells, by an impulse counter or by other similar means.

In FIG. 3, just as in the analogous FIG. 1, it can be seen how in case "A", where there is only one bar 12, the dimensional data monitored by the video cameras 119 and 120 will be the same and coherent with the nominal diameter of the bars 12 as pre-set in the processing unit 22.

In case "B", where there are two bars 12, the data monitored by the video camera 119 will be the same as the nominal diameter of the bars 12, but the data monitored by the video camera 120 will be different and greater than the nominal diameter.

This information, transmitted to the processing unit 22, will indicate the presence of more than one bar 12 in the seating of the screw-type translator 11.

In case "C", shown in FIG. 1, the data monitored by the two video cameras 119 and 120 will be the same, but greater than the nominal diameter of the bars 12.

Finally, for case "D" shown in FIG. 3, the positioning of the video cameras 119 and 120 with a set angle with respect to the vertical line 23 makes possible to determine the presence of three or more bars 12 in a single seating of the screw-type translator 11.

Figure 4:
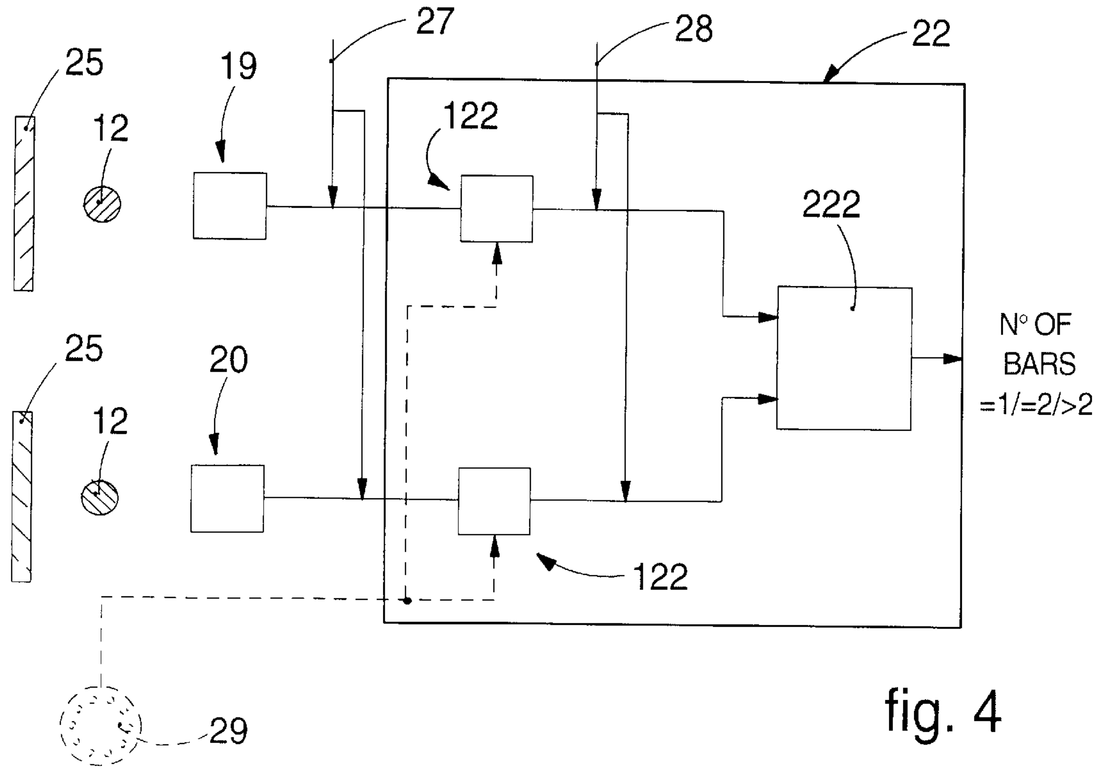
FIG. 4 is a block diagram of how the devices according to the invention shown in FIGS. 1 and 3 work.

FIG. 4 shows a block diagram of the device 10 according to the invention, where the optical monitoring means 19 and 20, cooperating with relative rear-lighting elements 25 arranged on the opposite side of the bars 12, send their signal 27, indicating presence or size, to a section 122 of the processing unit 22.

This section 122 is suitable to convert the signal 27 into a signal 28 corresponding to the dimensional value of the shadow subtended by the optical ray; the signal 28 is then sent to a section 222 of the processing unit 22 suitable to compare the dimensional value of the shadow with the nominal diameter of the bar 12 and to provide as output the information on the number of bars 12 explored.

In the case of the optical feelers 219 and 220 as shown in FIGS. 1 and 2 , cooperating with the section 122 of the processing unit 22 there is an encoder 29 which supplies information on the linear speed of feed of the bar 12.

What is claimed is:

1. Selection and control device to count bars being fed separated orthogonally to their axes on a plane and cooperating with a translating device having a plurality of nominal and theoretical seatings intended for transferring a single bar in each seating, the device being characterised in that it includes two optical monitors and a processing unit, the optical monitors being arranged at an angle with their apex substantially on the plane on which the bars are fed and whose respective monitoring axes cooperate with a portion of the plane on which the bar being fed passes, the respective monitoring axes having an angle of incidence with respect to the plane on which the bars are fed in the proximity of a common point cooperating substantially with the positioning seating of the bars on the translating device, each of the monitors lying on a plane substantially orthogonal to the plane on which the bars are fed, and to the axis of the bars, and including respective angles ("α", "β") with respect to a line vertical to the plane of feed, the angles ("α", "β") defining an angle ("γ") at the apex, the apex lying substantially on a line vertical to the plane of the feed of the bars, the processing unit receiving a signal concerning the field explored by each of the optical monitors, transforming the signal into a dimensional value, comparing the dimensional value with the pre-set nominal diameter of the bars and supplying, according to this comparison, an indication as to a number of bars present in each seating of the translating device so as to provide a determination as to whether a single bar is present in each seating or two or more bars are present in each seating.

2. Device as in claim 1, characterised in that the angle ("γ") at the apex is between 60° and 120°.

3. Device as in claim 1, characterised in that the angle ("γ") at the apex is about 90°.

4. Device as in claim 1, characterised in that the angle ("γ") at apex the is symmetrical with respect to a line vertical (23) to the plane of feed.

5. Device as in claim 1, characterised in that the optical monitors comprise optical feelers suitable to send a ray of light towards the bars and to monitor a return ray of light reflected by the bars.

6. Device as in claim 1, characterised in that the optical monitors comprise digital video cameras with one scanning line.

7. Device as in claim 6, characterised in that the video cameras cooperate with simultaneous activation means.

8. Device as in claim 6, characterised in that the video cameras cooperate with lighting means located behind the bars (12).

9. Selection and control method to count bars being fed separated orthogonally to their axes on a plane by a translating device having a plurality of nominal and theoretical seatings intended for translating one of the bars in each seating, comprising:

- an exploration step of a portion of the plane whereon the bars pass, the exploration being performed by two optical monitors arranged at an angle on a plane substantially orthogonal to the plane of feed of the bars and with respect to the axis of the bars;
- a step wherein the signal relating to the exploration made by each optical monitor is sent to a processing unit to determine the dimensional value of the bar or bars in a seating;
- a step wherein the dimensional values are compared with the nominal diameter of a bar, and
- a step to determine a number of bars present in a seating of the translating device according to the result of this comparison so as to provide a determination as to whether a single bar is present in each seating or two or more bars are present in each seating.

10. Method as in claim 9, characterised in that the optical monitors comprise first and second optical feelers cooperating with the bars moving on the translating device, and in that the step to determine the number of bars present in a seating includes making a comparison between a time taken by the first optical feeler to recognise the presence of the bar and a time taken by the second optical feeler to recognize the presence of the bar, the recognition time defining a measurement of the diameter of the bar, the measurement of the diameter of the bar being used as a factor of comparison with pre-set nominal diameter of the bar.

11. Method as in claim 10, characterised in that the time taken to recognise the bar is deduced from the factor relative to the control volume of each individual optical feeler.

12. Method as in claim 10, characterised in that the factor of comparison is a function of the speed of feed of the bar.

13. Method as in claim 9, characterised in that the optical monitors comprise digital video cameras with one scanning, line cooperating with the bars either stationary or moving on the translation means, and the step to determine the number of bars present in the seating includes comparing a size read by one video camera and a size read by the other video camera, a double measurement of size of the diameter of the bar being used as a factor to be compared with the pre-set nominal diameter of the bar.

14. Method as in claim 13, characterised in that the video cameras are arranged at an appropriate angle with respect to a line vertical to the plane of feed of the bars so as to ascertain the presence of three or more bars in a seating of the translating device.

* * * * *

UNITED STATES PATENT AND TRADEMARK OFFICE

CERTIFICATE OF CORRECTION

PATENT NO. : 6,088,111
DATED : July 11, 2000
INVENTOR(S) : Lorenzo Ciani et al.

It is certified that error appears in the above-identified patent and that said Letters Patent is hereby corrected as shown below:

Title page,
Item [73] Assignee, replace "Centro Automation SpA; Danielli C. Officine Meccaniche SpA" with -- Centro Automation SpA; Danielli & C. Officine Meccaniche SpA --

Signed and Sealed this

Twenty-first Day of May, 2002

*Attest:*

JAMES E. ROGAN
*Director of the United States Patent and Trademark Office*

*Attesting Officer*

UNITED STATES PATENT AND TRADEMARK OFFICE

CERTIFICATE OF CORRECTION

PATENT NO. : 6,088,111
DATED : July 11, 2000
INVENTOR(S) : Lorenzo Ciani et al.

It is certified that error appears in the above-identified patent and that said Letters Patent is hereby corrected as shown below:

Title page,
Item [73] Assignee, replace "Centro Automation SpA; Danielli C. Officine Meccaniche SpA" with -- Centro Automation SpA; Danieli & C. Officine Meccaniche SpA --

This certificate supersedes Certificate of Correction issued May 21, 2002

Signed and Sealed this

Twelfth Day of November, 2002

*Attest:*

JAMES E. ROGAN

*Attesting Officer*

*Director of the United States Patent and Trademark Office*